United States Patent
Anderson et al.

(10) Patent No.: US 7,570,320 B1
(45) Date of Patent: Aug. 4, 2009

(54) THERMO-OPTIC LIQUID CRYSTAL WAVEGUIDES

(75) Inventors: Michael H. Anderson, Lyons, CO (US); Scott D. Rommel, Lakewood, CO (US); Scott R. Davis, Denver, CO (US)

(73) Assignee: Vescent Photonics, Inc., Denver, CO (US)

( * ) Notice: Subject to any disclaimer, the term of this patent is extended or adjusted under 35 U.S.C. 154(b) by 0 days.

(21) Appl. No.: 11/514,478

(22) Filed: Aug. 31, 2006

Related U.S. Application Data

(60) Provisional application No. 60/713,393, filed on Sep. 1, 2005.

(51) Int. Cl.
*G02F 1/133* (2006.01)
*G02F 1/295* (2006.01)

(52) U.S. Cl. ............... 349/63; 349/61; 349/62; 385/8

(58) Field of Classification Search ............ 349/61, 349/62, 63; 385/8
See application file for complete search history.

(56) References Cited

U.S. PATENT DOCUMENTS

| | | | |
|---|---|---|---|
| 3,963,310 A | 6/1976 | Giallorenzi et al. | |
| 4,737,014 A | 4/1988 | Green | |
| 4,896,325 A | 1/1990 | Coldren | |
| 5,044,712 A | 9/1991 | Soref | |
| 5,317,446 A | 5/1994 | Mir et al. | |
| 5,319,668 A | 6/1994 | Luecke | |
| 5,347,377 A * | 9/1994 | Revelli et al. | 349/193 |
| 5,499,256 A | 3/1996 | Bischel et al. | |
| 5,504,772 A | 4/1996 | Deacon et al. | |
| 5,513,196 A | 4/1996 | Bischel et al. | |
| 5,766,974 A | 6/1998 | Sardella et al. | |
| 5,789,776 A | 8/1998 | Lancaster et al. | |
| 5,837,613 A | 11/1998 | Kalnitsky et al. | |

(Continued)

FOREIGN PATENT DOCUMENTS

EP    1186940    3/2002

(Continued)

OTHER PUBLICATIONS

"2 x 2 Optical Waveguide Matrix Switch Using Nematic Liquid Crystal", Kobayashi, IEEE Journal of Quantum electronics, vol. QE-18, No. 10, 1982.

(Continued)

*Primary Examiner*—Kianni C Kaveh
(74) *Attorney, Agent, or Firm*—Brownstein Hyatt Farber Schreck, LLP

(57) ABSTRACT

A waveguide having an adjustable index of refraction (or an adjustable optical path length, or for providing an adjustable optical phase delay) based in part on thermal effects in the waveguide. In one example, the waveguide may include a core for guiding a light beam through the waveguide; at least one cladding; liquid crystal material disposed within the waveguide; and at least one temperature control element, such as resistive heater, for receiving at least one control signal to control a temperature of at least a portion of the liquid crystal material; wherein the index of refraction (or the optical path length, or the optical phase delay of the light beam) of the waveguide is altered by an amount that is controlled by the control signal.

9 Claims, 2 Drawing Sheets

END VIEW

U.S. PATENT DOCUMENTS

| | | | |
|---|---|---|---|
| 6,041,071 | A | 3/2000 | Tayebati |
| 6,215,928 | B1 | 4/2001 | Friesem et al. |
| 6,324,204 | B1 | 11/2001 | Deacon |
| 6,330,388 | B1 | 12/2001 | Bendett et al. |
| 6,373,872 | B2 | 4/2002 | Deacon |
| 6,470,036 | B1 | 10/2002 | Bailey et al. |
| 6,480,513 | B1 | 11/2002 | Kapany et al. |
| 6,546,163 | B2 * | 4/2003 | Thackara ............ 385/18 |
| 6,603,902 | B1 | 8/2003 | So |
| 6,650,822 | B1 * | 11/2003 | Zhou ............ 385/147 |
| 6,763,047 | B2 | 7/2004 | Daiber et al. |
| 6,768,856 | B2 | 7/2004 | Akwani et al. |
| 6,816,140 | B2 * | 11/2004 | Fujieda ............ 345/87 |
| 6,816,516 | B2 | 11/2004 | Daiber |
| 6,853,654 | B2 | 2/2005 | McDonald et al. |
| 6,859,567 | B2 | 2/2005 | Galstian et al. |
| 6,859,572 | B2 | 2/2005 | Ishibashi |
| 6,920,159 | B2 | 7/2005 | Sidorin et al. |
| 7,079,724 | B2 * | 7/2006 | Thackara ............ 385/16 |
| 2001/0033400 | A1 | 10/2001 | Sutherland et al. |
| 2002/0041726 | A1 * | 4/2002 | Thackara ............ 385/16 |
| 2002/0140879 | A1 * | 10/2002 | Fujieda ............ 349/69 |
| 2002/0154878 | A1 | 10/2002 | Akwani et al. |
| 2003/0086448 | A1 | 5/2003 | Deacon |
| 2003/0103708 | A1 | 6/2003 | Galstian et al. |
| 2003/0137999 | A1 | 7/2003 | Spiegelberg et al. |
| 2003/0214700 | A1 * | 11/2003 | Sidorin et al. ............ 359/334 |
| 2003/0219197 | A1 * | 11/2003 | Kawamoto ............ 385/22 |
| 2003/0231279 | A1 * | 12/2003 | Wessel et al. ............ 349/198 |
| 2005/0135439 | A1 | 6/2005 | Chapman et al. |

FOREIGN PATENT DOCUMENTS

| | | |
|---|---|---|
| JP | 59052219 | 3/1984 |
| JP | 63244004 | 10/1988 |

OTHER PUBLICATIONS

"Near-IR tunable Laser with an Integrated LiTaO3 Electro-optic Deflector", Applied Optics, vol. 41, No. 30, Oct. 20, 2002.

"Integrated Optics with Liquid Crystals", Hermann, Chalmers University of Technology, 2000.

"Surface-stablilized Ferroelectric Liquid-Crystal Electro-optic Waveguide Switch", Clark, Applied Physics Letter 57 (18), Oct. 29, 1990.

"Optoelectronic router in Glass Waveguide with a Liquid Crystal Cladding", Coppola, et al., SPIE, vol. 4829, 2003.

"Lighting Scattering from Smectic Liquid-Crystal Waveguides", Gialorenzi, et al., Journal of Applied Physics, vol. 47, No. 5, May 1976.

"Nonlinear Properties of Waveguides with Twisted Nematic Liquid Crystal", Acta Physica Polonica A, vol. 99, 161-176, 2001.

"Electronically Tunable Ring Resonators Incorporating Nematic Liquid Crystals as Cladding Layers", Applied Physics, vol. 83, No. 23, 2003.

"Low Voltage Driving in Nematic Liquid Crystal Overlayered Waveguide", Okamura, et al., Journal of Lightwave Technology, vol. LT-4, No. 3, Mar. 1986.

"Optical Multimode Interference Router Based on a Liquid Crystal Waveguide", Sirleto, et al., Journal of Optics A: Pure Appl. Opt. 5, 2003.

"Electro-optical Switch and Continuously Tunable Filter Based on a Bragg Grating in a Planar Waveguide with a Liquid Crystal Overlayer", Opt. Eng. 41(11), Nov. 2002.

"Bistability and Switching in thin-Film Waveguides with Liquid-Crystal Cladding", Valera, Applied Physics Letter 48(9), Mar. 3, 1986.

"Optical Deflection in Thin-Film Nematic Liquid-Crystal Waveguides", Hu, IEEE Journal of Quantum Electronics, vol. QE-10, No. 2, Feb. 1974.

"Liquid-Crystal Waveguides for Integrated Optics", Whinnery, IEEE Journal of Qunatum Electronics, vol. QE-13, No. 4, Apr. 1977.

"Losses of a Nematic Liquid-Crystal Optical Waveguide", Hu, Journal of the Optical Society of America, vol. 64, No. 11, Nov. 1974.

"Tunable External-Cavity Diode Laser Based on Integrated Waveguide Structures", Repasky, Opt. Eng. 42(8), Aug. 2003.

"Proposal of Electrically Tunable External-Cavity laser Diode", IEEE Photonics Technology Letters, vol. 16, No. 8, Aug. 2004.

"Electro-optically Induced Deflection in Liquid-Crystal Waveguides", Sheridan, Journal of Applied physics, vol. 45, No. 12, Dec. 1974.

"High-Speed Continuously Tunable Liquid Crystal Filter for WDM Netoworks", Journal of Lightwave Technology, vol. 14, No. 6, Jun. 1996.

"Light Scattering from Nematic LiquidCrystal Waveguide", Giallorenzi, Journal of Applied Physics, vol. 46, No. 3, Mar. 1975.

"Prospectus for the Development of Liquid-Crystal Waveguides", Schnur, Naval research Laboratory, NRL Report 7507, Nov. 10, 1972.

European Search Report from corresponding European patent application (05722475.0) dated Nov. 22, 2007.

* cited by examiner

THERMO-OPTIC LIQUID CRYSTAL WAVEGUIDES

CROSS-REFERENCE TO RELATED APPLICATIONS

This application claims under 35 U.S.C. § 119(e) the benefit of U.S. provisional patent application No. 60/713,393 entitled "Thermo-optic Liquid Crystal Waveguides," filed Sep. 1, 2005, the disclosure of which is hereby incorporated by reference in its entirety.

This application also incorporates by reference U.S. patent application Ser. No. 11/040,549, filed Jan. 21, 2005, entitled "Tunable Laser Having Liquid Crystal Waveguide," and U.S. patent application Ser. No. 10/963,946, filed Oct. 12, 2004, entitled "Liquid Crystal Waveguide Having Refractive Shapes for Dynamically Controlling Light," the disclosures of which are hereby incorporated by reference in their entirety.

BACKGROUND OF THE INVENTION

Light can be controlled using standard lenses and mirrors. These passive methods can be made active via mechanical motion. For example, mirrors can be placed on motorized stages or piezo mounts to move the mirror to control either the direction of light propagation and/or the total optical path length of a system. By altering the total optical path length, the optical phase delay (OPD) of the light may be controlled.

However, mechanical control over light is undesirable for several reasons. First, it is difficult to make such mechanical devices compact. Second, the mechanical nature of such moving devices have limited lifetimes due to mechanical wear and failure issues. Third, mechanical devices are inherently vibration sensitive, which limits the type of environment in which they can be used. Finally, mechanical devices necessitate a level of design complexity including gears, bearings, and other mechanical components, which add cost, expense, and maintenance issues to such designs.

As an alternate to mechanical devices, one may utilize conventional thermally controlled waveguides for the dynamic control of light. In this waveguide technique, the temperature of the waveguide can be used to alter the index of refraction for light traveling through the waveguide. Typically such thermo-optic approaches provide for only limited changes in index of refraction ($dn/dt \approx 1.5 \times 10^{-5}/°$ C.), which in turn necessitates large temperature changes (up to 500° C.). These devices are therefore typically power consumptive, which is prohibitive for many applications.

As recognized by the present inventors, what is needed is a thermo-optic waveguide for controlling light that permits active control of the propagation of light through the waveguide.

It is against this background that various embodiments of the present invention were developed.

SUMMARY

In light of the above and according to one broad aspect of one embodiment of the present invention, disclosed herein is a waveguide having an adjustable index of refraction (or an adjustable optical path length, or an adjustable optical phase delay). In one example, the waveguide includes a core for guiding a light beam through the waveguide; at least one cladding; liquid crystal material disposed within the waveguide; and at least one temperature control element for receiving at least one control signal to control a temperature of at least a portion of the liquid crystal material; wherein the index of refraction (or the optical path length, or the optical phase delay) of the waveguide is altered by an amount that is controlled by the control signal.

In one example, the liquid crystal material may be disposed within the at least one cladding, and the liquid crystal material may be a nematic material. The at least one temperature control element may include a resistive heater and/or may include at least one conductive layer.

In another example, the at least one temperature control element includes an upper temperature control element and a lower temperature control element.

The light beam traveling in the waveguide may include TM polarized light and/or TE polarized light. The at least one control signal may include a DC voltage, an AC voltage, a current (DC or AC), or any other electrical signal depending upon the implementation.

The features, utilities and advantages of the various embodiments of the invention will be apparent from the following more particular description of embodiments of the invention as illustrated in the accompanying drawings.

DETAILED DESCRIPTION

Disclosed herein are various embodiments of a liquid crystal waveguide for dynamically controlling the index of refraction (or optical path length) of the waveguide, and thereby controlling the propagation speed of light passing through the waveguide. This thereby enables control of the amount of optical phase delay (OPD) of light passing through the waveguide. Generally, liquid crystal materials can be disposed within a waveguide in a cladding proximate or adjacent to a core layer of the waveguide, however liquid crystal material may be included in all or part of the waveguide core. According to some embodiments of the present invention, the temperature of the liquid crystal material can be controllably altered, thereby altering the index of refraction of the waveguide for light traveling through the waveguide.

Liquid crystals may have indices of refraction that depend on temperature to a much larger extent than more conventional materials such as silicon dioxide ($SiO_2$) or glass. For example, liquid crystals may have a $dn/dt \approx 1.7 \times 10^{-3}/°$ C. The index of refraction of such liquid crystal materials may change by 0.1 or greater over reasonable temperature ranges such as a range of 30° C. For example, the index of refraction for a liquid crystal material known as 5CB can change by 0.1 for a temperature change of less than 30 degrees centigrade.

Figure 1:
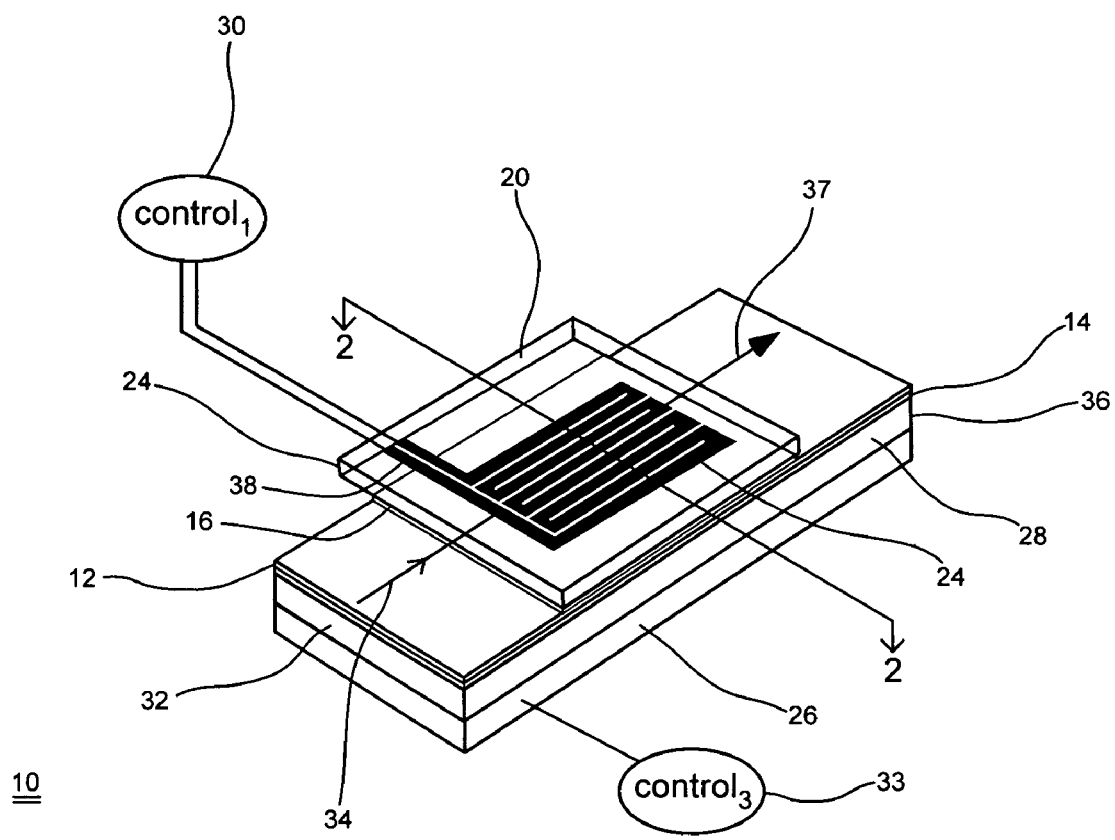
FIG. 1 illustrates an example of a waveguide having at least one thermal control element, in accordance with one embodiment of the present invention.
Figure 2:
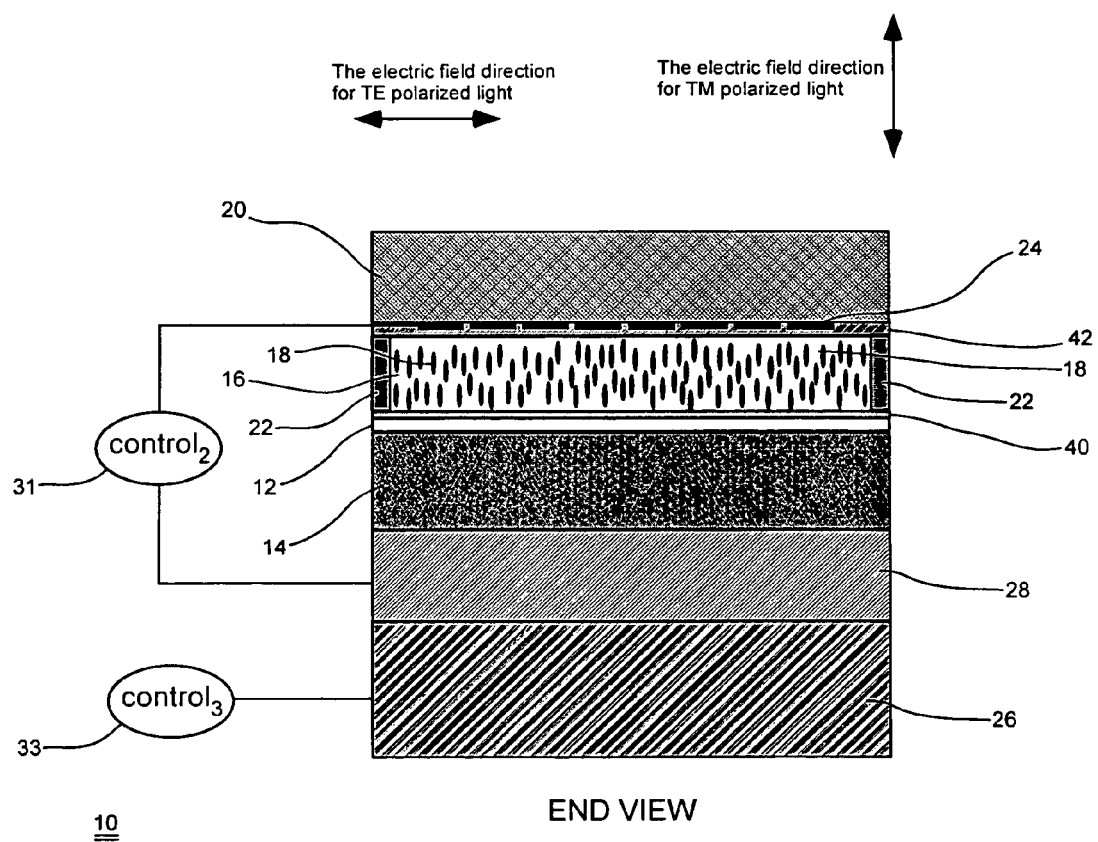
FIG. 2 illustrates a sectional view of an example of a waveguide having at least one thermal control element, in accordance with one embodiment of the present invention.

Referring to FIGS. 1-2, a waveguide 10 may include a core 12, a pair of claddings 14, 16 surrounding the core 12 wherein one of the claddings (e.g., the upper cladding 16) contains liquid crystal material 18 therein. In one example, a coverplate 20 and glue walls 22 may surround the liquid crystal material 18, which has been disposed within the upper cladding 16. Alternatively, the liquid crystal material 18 may also be disposed within the waveguide core 12 and/or within the lower cladding 14. In one example, one or more thermal control elements 24 are positioned above the upper cladding 16, and/or one or more thermal control elements 26 are positioned below the lower cladding 14. The waveguide 10 may also include a substrate 28, which may be positioned between the lower cladding 14 and a lower thermal control element 26. The substrate 28 may provide additional structural support and may also serve as an electrode or conductive plane.

The one or more thermal control elements 24, 26 may receive a control signal 30. This control signal may be a DC voltage, an AC voltage, an electric current, or other means of control and may be connected across the thermal element 24 as shown in FIG. 1, or may be connected between thermal element 24 and substrate 28 with another example shown as 31 in FIG. 2. As the control signal 30 is controllably altered, the temperature of the liquid crystal material 18 is also controllably altered. As the temperature of the liquid crystal material 18 changes, the index of refraction of the liquid crystal material 18 controllably and dynamically changes as a function of its temperature.

As shown in the example of FIG. 1, the waveguide 10 may be generally rectangular in shape and may include a core 12 having a generally rectangular cross-section or defining a parallel piped. On the front end 32 of the waveguide 10, light 34 is introduced into the waveguide core 12 and propagates along the length of the waveguide 10 to the distal end 36 of the waveguide 10. As shown in FIG. 1, the direction 37 of propagation of light 34 through the waveguide 10 is generally along the length of the waveguide 10, and use of embodiments of the present invention permit the index of refraction to be controllably altered depending, in part, on the alignment of the liquid crystals 18 and the temperature of the liquid crystal 18 as determined by the temperature control elements 24, 26. Although the waveguide 10 in FIG. 1 is shown as generally rectangular, it is understood that a waveguide 10 made according to one or more embodiments of the present invention could have other shapes such as square, trapezoid, parallelogram, any polygon, or even be diced or scribed so as to have rounded edges producing elliptical, circular, or any curved shape.

In one example, the at least one temperature control element 24 may include a resistive film deposited on the lower surface of the coverplate 20. As current passes through this resistive film, the temperature of the film will increase. This film may therefore act as a resistive heater and thereby serve as a temperature control element 24. Furthermore, in this example, at least one control signal 30 may include a DC voltage, which in turn may control the amount of electrical current that passes through the film. By controllably increasing the DC voltage, one may controllably increase the temperature of the resistive heater 24 and therefore also increase the temperature of the liquid crystal material 18. The resistive film may be deposited on the underside of a coverplate 20 in a pattern such that a uniform temperature may be created over a region of the waveguide 10. The resistive heater 24 may include one or more tabs or extensions 38 there from which the resistive heater 24 may be electrically connected to other electrical elements, such as the control signal 30.

Alternatively or additionally, the waveguide 10 may include a temperature control element 26 that is positioned on another layer of the waveguide 10. In one example, this temperature control element 26 may include a thermo-electric-cooler (TEC), which may be used to increase or decrease the temperature of the waveguide 10. The temperature of the thermo-electric cooler 26 may be controllably increased or decreased through the use of a control signal 33 (FIG. 2), which may be the same or different than control signal 30, and may include a DC voltage or an electric current.

In another example, the waveguide 10 may include both an upper and a lower temperature control element 24, 26. For example, a lower temperature control element 26 may include a TEC and an upper temperature control element 24 may include a resistive heater. In this example, the TEC lower temperature control element 26 may serve as a heat-sink or temperature reduction system by maintaining the substrate 28 and lower cladding 14 at a colder temperature relative to the temperature of the liquid crystal material 18, and the resistive heater upper temperature control element 24 may serve as heater or temperature increase system to increase the temperature of the liquid crystal material 18. The resistive heater 24, which may be affixed to the lower surface of the coverplate 20, may be positioned close to the liquid crystal material 18 and therefore, through an increase in the current flowing through the heater 24, the temperature of the liquid crystal material 18 may be rapidly increased. Alternatively, as current flowing through the resistive film 24 is decreased, the heat within the liquid crystal material 18 may be removed through the lower temperature control element 26, i.e., the TEC that is maintaining the waveguide substrate 28 and lower cladding 14 at a cooler temperature. In this way, the temperature of the liquid crystal material 18 within the waveguide 10 may be controllably increased and/or controllably decreased. Therefore, the index of refraction of the waveguide 10 may also be controllably increased and/or controllably decreased.

In another example, the at least one temperature control element 24 may include one or more conductive layers or electrodes. In one example, electrodes or conductive layers may be positioned both above the upper cladding 16 and below the lower cladding 14. The upper conductive layer may be applied to the lower surface of the coverplate 20, and the lower electrode surface may be the substrate 28, which is beneath the lower cladding 14. The control signal 31 may include an alternating current (AC) voltage applied across these two electrodes. The frequency of the alternating current may be sufficiently high enough, for example above 5 kHz, such that as the amplitude is increased, current will flow through the waveguide upper cladding 16, core 12, and lower cladding 14. As this current flows through the waveguide 10, from the upper conductive layer 24 to the lower conductive layer 28, it may heat the liquid crystal material 18 that is disposed within the waveguide 10. The amount of heating is dependent on the magnitude of current, which may be controllably altered either by altering the amplitude or the frequency of the AC control signal 31. In this way, either the frequency and/or the amplitude of the AC voltage control signal 31 may be altered to controllably alter the index of refraction of the waveguide 10.

FIG. 2 illustrates a sectional view, taken along sectional line 2-2 in FIG. 1, of a waveguide 10 in accordance with one embodiment of the present invention. As shown in FIG. 2, in one example, a waveguide 10 may include a substrate 28 such as a silicon substrate or a p-doped silicon substrate, which provides structural support for the waveguide 10 and can serve as a conductive layer. The substrate 28 may also be formed from any metal, such as silver, copper, aluminum, gold, titanium, etc. Alternatively, the substrate 28 can be nonconductive, such as a glass or a crystalline material.

A lower cladding layer 14 is provided on the substrate 28 and is preferably made of any dielectric materials with low absorptions whose index of refraction is less than the index of refraction of the core 12. Suitable materials include but are not limited to Silicon OxyNitride, Silicon-Rich Nitride, Silicon Nitride, Tantalum Pentoxide, Polymers, Pure Silicon, Ion exchange glass on substances such as Lithium Niobate, Sol-Gel, thermally oxidized silicon, and glass. In one example, the interface between the lower cladding 14 and the core layer 12 is transparent so that light can penetrate the lower cladding 14 as it propagates through the core 12.

On top of the lower cladding 14, a waveguide core 12 is provided. In one embodiment, the core 12 does not include any liquid crystal 18 material therein. The core 12 may be made of materials such as any dielectric materials with low absorptions whose index of refraction is greater than the index of refraction of the upper and lower cladding 16, 14. Suitable materials include, but are not limited to, Silicon OxyNitride, Silicon Rich Nitride, Silicon Nitride, Tantalum Pentoxide, Polymers, Pure Silicon, Ion exchange glass on substances such as Lithium Niobate, Sol-Gel, thermally oxidized silicon, glass.

In one example, the core 12 has a thickness that is tapered or includes a channel. Furthermore, a core 12 may have a constant index of refraction along the length of the waveguide 10, or alternatively have an index of refraction that varies across or along the waveguide 10. In another embodiment, the liquid crystal material 18 may be disposed in the core layer 12, or may serve as the core layer 12.

On top of the core layer 12, an alignment layer 40 is provided which is used to initially align or bias the orientation of liquid crystal material 18 that is proximate to or adjacent to the alignment layer 40 and the core 12. Alignment can be achieved, for example, by buffed polyimide, nylon, or other polymer coatings applied to the core 12 and/or the coverplate 20, photo-aligned polyimide, polymer or other photo-aligned material, angle deposited SiO, $SiO_2$ or other angle deposited material, microgrooves etched into the core 12 and/or coverplate 20, ion-buffing, a dispersed polymer matrix that is photoaligned, or direct buffing. In one example, the alignment layer 40 may induce a homeotropic alignment in the liquid crystal 18. In another example, the alignment layer 40 may induce a homogeneous alignment in the liquid crystal 18. In one example, the lower alignment layer 40 is generally transparent.

On top of the lower alignment layer 40, the upper cladding 16 is provided having liquid crystal material 18 therein. In one example, the interface between the lower alignment layer 40 and the upper cladding 16 is transparent. The liquid crystal material 18 may include, but is not limited to, any nematic liquid crystal, with either a positive dielectric constant or a negative dielectric constant or a mixture of each, polymer dispersed liquid crystal material, Smectic A* and C* liquid crystal material, cholesteric liquid crystal material such as ferroelectrics and surface stabilized ferroelectrics, or dual-frequency liquid crystal material, for example. The liquid crystal material 18 may be laterally contained by glue walls 22, which also serve to affix the coverplate 20.

In one example, the upper cladding 16 is formed using spacer material to define a region or volume wherein liquid crystal material 18 may be contained therein, and optically transparent glue such as Norland 68 may be used to create transparent boundary glue walls 22 to contain the liquid crystal 18.

On top of the upper cladding 16, an upper alignment layer 42 may be provided to initially align or bias the orientation of liquid crystal material 18 that is adjacent to or proximate to the upper alignment layer 42. As with the lower alignment layer 40, the upper alignment layer 42 may include, for example, buffed polyimide coatings applied to the coverplate 20, photo-aligned polyimide, angle deposited SiO and or $SiO_2$, microgrooves etched or otherwise formed into the coverplate 20, ion-buffed surfaces on the coverplate 20, a dispersed polymer matrix that is photoaligned, or direct buffing. In one example, the upper alignment layer 42 is generally transparent.

The alignment of the liquid crystal 18 between the lower and upper alignment layers 40, 42 can be anti-parallel, parallel, twisted, or hybrid between twisted and parallel or anti-parallel. The direction of liquid crystal alignment can be at any angle with respect to the direction 37 of light propagation. Illustrated in FIG. 2 are alignment layers 40, 42 that provide for the long axis of a nematic liquid crystal to be oriented perpendicular to both the direction 37 of light propagation and the upper surface of the core 12.

On top of the upper alignment layer 42 and below the glass cover 20, a temperature control element or portions of a temperature control element layer 24 may be included. In one example, the temperature control element 24 may be a conductive coating applied to the bottom surface of the glass cover 20. The conductive coating can include, but is not limited to, ITO, tin-oxide, Au, Ag, Al, Cu, or any other conductive coating. In order to serve as a heater element 24, the conductive coating can have an electrical resistance.

In one example, the glass cover 20 may be made of materials such as, but not limited to, standard float glass such as Corning 1737, fused silica, or the like. Since the evanescent portion of the light 34 does not pass through the coverplate 20, the coverplate 20 can be made from non-transparent materials such as silicon wafers, ceramics, or polished metal surfaces. In another embodiment, the coverplate 20 may be a metal to which another heater such as a TEC or resistive heater has been affixed, or any other material whose temperature can be controlled.

Embodiments of the present invention can be used to simultaneously and or independently control the index of refraction for particular types of polarized light, such as TM polarized light and TE polarized light. Generally, TM (Transverse Magnetic) polarized light means that the magnetic field of the light wave is traversing the plane of the waveguide 10, while the electric field is substantially perpendicular to the plane of the waveguide 10. TE (Transverse Electric) polarized light is characterized by the electric field of the light 34 traversing the plane of the waveguide 10, while the magnetic field of the light 34 is substantially perpendicular to the plane of the waveguide 10.

The light 34 may include TE polarized light and/or TM polarized light. Using the structure of FIGS. 1-2 or variations thereof, various different waveguides can be formed to controllably alter the index of refraction of TE and/or TM polarized light as it passes through the waveguide. When one or more temperature control elements 24, 26 are used to alter the temperature of the liquid crystal 18, the index of refraction of the liquid crystal 18 may be controllably altered. This can be used to alter the index of refraction for TE polarized light, TM polarized light, or both simultaneously.

Preferably, the core layer 12 may be surrounded by an upper and lower cladding 16, 14, wherein the interfaces between the lower cladding 14 and the core layer 12 and between the upper cladding 16 and the core layer 12 are transparent. As light 34 enters the core layer 12 and propagates through the core 12 along the length of the waveguide 10, the evanescent portion of the propagating light waves 34 penetrate into both the upper and lower cladding 16, 14.

In one example, the core layer 12 has a substantially fixed index of refraction, and the lower cladding 14 also has a substantially fixed index of refraction. By providing liquid crystal material 18 within the upper cladding 16, a portion of which is controllably subjected to an adjustable temperature, the index of refraction of the upper cladding layer 16 can be controllably altered. Stated differently, the average index of refraction (i.e., the effective index of refraction or the index of refraction) of the upper cladding 16, core 12, and lower cladding 14 as experienced by light 34 (i.e., a single TM or TE mode of light) in the waveguide 10 can be controllably altered by altering the index of refraction of the upper cladding 16. Hence, as light 34 passes through the waveguide core 12 and upper and lower cladding 16, 14, the index of refraction experienced by the light 34 can be controllably altered. In one example, because the liquid crystal material 18 is disposed within the upper cladding 16 and interacts primarily with the evanescent portion of the light wave 34 and the fundamental portion of the light wave 34 passes through the core material 12, there is no significant attenuation of the intensity of the light 34 as the light 34 passes through the waveguide 10, which permits the length of the waveguide 10 to be beneficially long to allow large control over the optical phase delay.

Furthermore, in this example, the evanescent portion of the light 34 is generally interacting with the liquid crystal molecules that are close to an alignment layer 40. These molecules are more highly ordered than liquid crystal molecules further away from the alignment layer 40 and therefore scatter less light. In one example, the losses are sufficiently low (e.g., less than 0.5 dB/cm) that the waveguide length can be lengthy (e.g., 4 inches or greater).

While FIGS. 1-2 show a particular arrangement of layers of a waveguide 10 according to one embodiment of the present invention, it is understood that the present invention contemplates variations of this arrangement. For instance, the at least one temperature control element 24, 26 may be positioned at different layers within the waveguide 10 if desired. Further, while two alignment layers 40, 42 are shown, it is believed the invention may be implemented using a single alignment layer (e.g., 40). While the liquid crystal material 18 is shown as disposed within the upper cladding 16, it is understood that the liquid crystal material 18 may be disposed in the lower cladding 14 if desired, or within the core 12.

In another example of the present invention, one or more upper thermal control elements 24 may define one or more shapes having at least one edge or interface that is non-normal to the direction 37 of light propagation through the waveguide 10. The one or more shapes defined by the upper thermal control element 24 may be used to controllably refract or bend or steer light as light 34 passes through the core 12 and upper and lower claddings 16, 14 of the waveguide 10. The upper temperature control element 24, may be shaped or patterned in various manners, including generally triangular or wedge shaped for steering light 34, or the shapes may include various lens shapes for focusing or defocusing light 34 that passes through the waveguide 10. The temperature control elements 24 may be shaped or arranged in various configurations depending upon the implementation, and may utilize the same or similar shapes or configurations of the patterned electrodes shown or described in the cross-referenced applications, U.S. patent application Ser. No. 11/040,549, filed Jan. 21, 2005, entitled "Tunable Laser Having Liquid Crystal Waveguide," and U.S. patent application Ser. No. 10/963,946, filed Oct. 12, 2004, entitled "Liquid Crystal Waveguide Having Refractive Shapes for Dynamically Controlling Light," the disclosures of which are hereby incorporated by reference in their entirety.

Many devices may be created with one or more features of embodiments of the present invention, such as tunable lenses, tunable-pitch gratings, polarization control elements, adjustable delay lines, tunable resonators, optical switching elements, dynamically tunable filters, and many others. Other examples include compact Fourier transform spectrometers for chemical sensing; robust tunable diode lasers; continuously tunable lasers; beamsteering and focusing modules for laser printers; optical disk pickups; beamsteerers for free-space laser communications; and reconfigurable optical interconnects for computing and telecommunications.

Thermo-Optic Liquid Crystal Waveguide Example

Described below is one example of a liquid crystal waveguide 10 in which the waveguide 10 is designed to provide for $32\pi$ radians optical phase delay for TM polarized light and is described as an example only. It is understood that this example is provided for illustrative purposes only, and does not limit the scope of embodiments of the present invention. In one example, a substrate may be formed utilizing a double-side polished silicon wafer. Upon the silicon wafer, a thermally oxidized lower cladding can be grown with a thickness of approximately 2 microns. The lower cladding refractive index at a wavelength of 1550 nanometers may be approximately 1.45. $SiO_xN_y$ can be applied over the lower cladding by plasma enhanced chemical vapor deposition to a thickness of approximately 550 nanometers to form the core. The $SiO_xN_y$ may be deposited to create a core with a refractive index of approximately 2 at a wavelength of 1550 nanometers. Identical coatings may be applied to both sides of the wafer in order to balance stresses, and therefore mitigate warping or bending of the wafer. Alternatively, the core layer may be created with a tantalum pentoxide layer deposited via an ion beam sputtering process. The tantalum pentoxide may have an index of refraction of approximately 2 and the core layer may have a thickness of approximately 500 nm, in one example.

A cover plate, which may be made of 1.1 millimeter thick 1737 corning glass coated on one side with an indium tin oxide (ITO) film to produce a nominal 100 ohms/square conductive layer, may be used for the upper heating element, and may be diced to a size that would allow for a 10 millimeter interaction length between the coupled light and the liquid crystal and may have sufficient over-hang on both sides of the waveguide to attach 1 millimeter wide and 10 millimeter long bus bar electrodes parallel to the waveguide.

The wafer, which may be generally round with a diameter of 100 mm, may be diced into smaller 20 millimeter by 40 millimeter parts. Each diced part may then be coated with an alignment film approximately 120 angstroms in thickness. The alignment film or layer may be used to induce a homeotropic orientation of the liquid crystal upper cladding. The film or layer may be produced by spin coating an 8:1 mixture of Nissan polyimide varnish solvent # 21 to Nissan polyimide type 1211 filtered at 0.2 microns at 3000 revolutions per minute. The same spin coating process may be performed on the ITO heater cover plate. Once both the wafer and the cover glass are coated with the polyimide, the polyimide may be imidized by baking in an oven at approximately 180 degrees Celsius for approximately one hour. The polyimide coatings may be mechanically buffed with a dense piled cloth to induce preferential alignment along the light wave propagation direction of the waveguide. The 1737 glass coverplate may be spaced from the diced wafer parts with 5-micron borosilicate glass spacers immersed in a ultra-violet curing adhesive such as Norland 68. The cover plate may then be attached to the waveguide so as to create an anti-parallel liquid crystal alignment. The waveguide may then be exposed to 365-nanometer light until fully cured. Straight Norland 68 may be used to backfill via capillary action the remaining exposed edges making up the glue walls. One 3-millimeter opening may be left on a side 90 degrees to the buff direction. 4-cyano-4-n-pentylbyphenyl (5CB) liquid crystal material supplied by EMD Chemicals, Inc., may then be introduced into the upper cladding. While the liquid crystal material is introduced to the waveguide the air pressure may be held at 30 microns of vacuum. Once filled, the hole in the glue wall may be plugged by using Norland UVS-91 visible-uv curing adhesive. Once fully cured the output edge of the assembled device may be polished utilizing diamond impregnated polishing pads supplied by Ultratec Manufacturing, the final polish may be performed using a 0.2 micron diamond pad. Wires may then be attached to the two ITO electrodes using conductive epoxy, each connection may be elongated to produce 1 millimeter wide and 10 millimeter long bus bars parallel to the waveguide.

A TEC element of approximately the same size as the waveguide may be attached to the waveguide with good thermal contact to the waveguide.

Example of operation may include coupling 1400-nanometer light into the waveguide by means of a silicon 45-45-90 prism. TM light may be introduced into the TM0 mode of the waveguide. The TEC cooler attached to the waveguide may be driven to cool the cell down to just above crystallization of the liquid crystal, which for 5CB is approximately 24 degrees Celsius, thus maximizing the liquid crystal refractive index of $n_e$. By running sufficient current through the ITO, heating of the liquid crystal layer will result in a reduction on the refractive index $n_e$. Alternatively, rather than using the ITO as a resistive heating element, one may utilize high conductivity ITO and capacitively heat the liquid crystal directly. For example, a typical liquid crystal waveguide has a capacitance of approximately 0.3 nanofarads. If an AC drive voltage of 10 volts is applied, with a frequency of 100 kHz, then approximately 1.5 milliamps will flow through the cell. This will directly heat the liquid crystal material, at a power rate of approximately 15 milliwatts. This can be controlled either by altering the frequency of the drive waveform, or the amplitude. To measure the resulting phase change in the TM light as temperature is varied a mach-zehnder style interferometer may be set-up by interfering the TM out-put from the waveguide to TE light not coupled into the system. For 1400 nanometer light an InGaAs photo-detector may measure the constructive and destructive interference of the interfering TM and TE light, each subsequent constructive or destructive fringe measured on the detector would represent $2\pi$ phase change. Theoretical modeling indicates that the OPD may be tuned by $32\pi$.

Accordingly, it can be seen that embodiments of the present invention provide for dynamic non-mechanical control of light as it propagates through the waveguide. This technology could be replacements for such wide-spread applications as retail store bar-code scanners, CD/DVD optical read/write heads, the emerging markets of optical/holographic datastorage, telecommunications optical switches, bio-sensing (i.e., lab-on-a-chip) applications, optical computer backplanes, for example. In addition to the beam steerer applications, tunable lens designs could permit electro-optic zoom lenses, selective detection for lab-on-a-chip biosensors, tunable collimation lenses for fiber to waveguide couplers, for example.

Embodiments of the present invention may be used in conjunction with conventional digital and analog circuitry, either separately or integrated on a single integrated circuit. For instance, the voltage or current applied to one or more thermal control electrodes may be controlled by a microprocessor or other logic or programmable logic devices, and such logic may be included on-chip with the waveguide.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to embodiments thereof, it will be understood by those skilled in the art that various other changes in the form and details may be made without departing from the spirit and scope of the invention.

The invention claimed is:

1. A waveguide having an adjustable index of refraction, the waveguide receiving a light beam, the waveguide comprising:
a core for guiding the light beam through the waveguide;
at least one cladding;
liquid crystal material disposed within the at least one cladding of the waveguide; and
at least one temperature control element for receiving at least one control signal to control a temperature of at least a portion of the liquid crystal material;
wherein when the at least one control signal is applied to the at least one temperature control element, a temperature of the temperature control element rises, thereby heating up the temperature of the portion of liquid crystal material, thereby altering the index of refraction of the waveguide by an amount that is controlled by the control signal.

2. The waveguide of claim 1, wherein the liquid crystal material is a nemetic material.

3. The waveguide of claim 1, wherein the at least one temperature control element includes a resistive heater.

4. The waveguide of claim 1, wherein the at least one temperature control element includes at least one conductive layer.

5. The waveguide of claim 1, wherein the at least one temperature control element includes an upper temperature control element and a lower temperature control element.

6. The waveguide of claim 1, wherein the light beam includes a TM polarized light beam.

7. The waveguide of claim 1, wherein the light beam includes a TE polarized light beam.

8. The waveguide of claim 1, wherein the at least one control signal includes a DC voltage.

9. The waveguide of claim 1, wherein the at least one control signal includes an AC voltage.

* * * * *